United States Patent
Kim

(10) Patent No.: US 12,534,083 B2
(45) Date of Patent: Jan. 27, 2026

(54) APPARATUS AND METHOD OF PROCESSING TRAFFIC LIGHT INFORMATION OF AUTONOMOUS VEHICLE

(71) Applicant: HL Klemove Corp., Incheon (KR)

(72) Inventor: Taehan Kim, Anyang (KR)

(73) Assignee: HL Klemove Corp., Incheon (KR)

( * ) Notice: Subject to any disclaimer, the term of this patent is extended or adjusted under 35 U.S.C. 154(b) by 160 days.

(21) Appl. No.: 18/466,009

(22) Filed: Sep. 13, 2023

(65) Prior Publication Data
US 2024/0140429 A1    May 2, 2024

(30) Foreign Application Priority Data

Oct. 31, 2022   (KR) .................. 10-2022-0142974

(51) Int. Cl.
| | |
|---|---|
| G08G 1/00 | (2006.01) |
| B60W 30/18 | (2012.01) |
| B60W 40/105 | (2012.01) |
| B60W 60/00 | (2020.01) |
| G08G 1/01 | (2006.01) |
| G08G 1/095 | (2006.01) |
| H04W 4/44 | (2018.01) |

(52) U.S. Cl.
CPC .... *B60W 30/18154* (2013.01); *B60W 40/105* (2013.01); *B60W 60/001* (2020.02); *G08G 1/0112* (2013.01); *G08G 1/095* (2013.01); *H04W 4/44* (2018.02); *B60W 2556/45* (2020.02)

(58) Field of Classification Search
CPC ........ B60W 30/18154; B60W 40/105; B60W 60/001; B60W 2556/45; B60W 60/0025; B60W 2520/06; B60W 2520/10; B60W 2554/802; B60W 2555/60; B60W 2556/50; G08G 1/0112; G08G 1/095; G08G 1/00; H04W 4/44; G01C 21/3461
USPC .......................................................... 701/23
See application file for complete search history.

(56) References Cited

U.S. PATENT DOCUMENTS

2023/0055693 A1*   2/2023 Park ..................... G06V 20/593

* cited by examiner

*Primary Examiner* — Shardul D Patel
(74) *Attorney, Agent, or Firm* — Harvest IP Law, LLP

(57) ABSTRACT

The present disclosure relates to an apparatus and a method of processing traffic light information for an autonomous vehicle, which selectively receive and process signal information of an intersection of interest based on a position and a heading direction of the autonomous vehicle, and the apparatus includes: a positioning module 101 to detect a position and a heading direction of an autonomous vehicle 200; a navigation module 102 for selecting an intersection of interest based on the position and the heading direction of the autonomous vehicle 200; and a signal processing module 103 for selecting traffic light information of the intersection of interest from a V2I message, and selecting signal information for a directional signal of interest corresponding to a direction of travel of the autonomous vehicle at the intersection of interest from the traffic light information.

18 Claims, 5 Drawing Sheets

| TRAFFIC LIGHT INFORMATION | | | | |
|---|---|---|---|---|
| intersection state (List) | Movement State (List) | I-ID | | |
| | | signal group ID | | |
| | | Movement Event | event state | |
| | | | timing | min EndTime |

FIG. 3

| | GO-STRAIGHT SIGNAL FOR EACH DIRECTION | LEFT TURN SIGNAL FOR EACH DIRECTION | FINAL DETERMINATION |
|---|---|---|---|
| State | Green | Green | |
| | Green | Red | |
| | Red | Green | |
| | Red | Red | |
| | Yellow | Yellow | |

FIG. 4

APPARATUS AND METHOD OF PROCESSING TRAFFIC LIGHT INFORMATION OF AUTONOMOUS VEHICLE

CROSS-REFERENCE TO RELATED APPLICATIONS

This application claims benefit and priority to Korean Patent Application No. 10-2022-0142974, filed on Oct. 31, 2022, with the Korean Intellectual Property Office, the disclosure of which is incorporated herein in its entirety by reference.

TECHNICAL FIELD

The present disclosure relates to an autonomous vehicle, and particularly, to an apparatus and a method of processing traffic light information for an autonomous vehicle, which selectively receive and process signal information of an intersection of interest based on a position and a heading direction of the autonomous vehicle.

BACKGROUND

In recent years, vehicles have been equipped with autonomous driving systems that automatically perform driving without the driver being involved to improve convenience for the driver.

PRIOR ART LITERATURE

Patent Document

Korean Patent Application Laid-Open No. 10-2022-0091014 (published on Jun. 30, 2022)

SUMMARY

The present disclosure is conceived in response to the background art, and has been made in an effort to provide an apparatus and a method of processing traffic light information for an autonomous vehicle, which selectively process signal information of an intersection of interest based on a position and a heading direction of the autonomous vehicle.

An exemplary embodiment of the present disclosure provides an apparatus for processing traffic light information for an autonomous vehicle, the apparatus including: a positioning module to detect a position and a heading direction of an autonomous vehicle; a navigation module for selecting an intersection of interest based on the position and the heading direction of the autonomous vehicle; and a signal processing module for selecting traffic light information of the intersection of interest from a V2I message, and selecting signal information for a directional signal of interest corresponding to a direction of travel of the autonomous vehicle at the intersection of interest from the traffic light information.

The intersection of interest is an intersection that the autonomous vehicle is to reach first.

The navigation module further calculates a distance between the autonomous vehicle and a stop line of the intersection of interest.

When the distance between the autonomous vehicle and the stop line of the intersection of interest calculated by the navigation module is less than or equal to a preset threshold, the signal processing module selects traffic light information of the intersection of interest from the V2I message.

The threshold is variable based on a vehicle speed of the autonomous vehicle.

The signal information for the directional signal of interest includes a state of the directional signal of interest and a state transition time of the directional signal of interest.

The signal processing module determines a state of the directional signal of interest based on an event state for the directional signal of interest in the traffic light information.

The signal processing module determines a state transition time of the directional signal of interest based on a min end time from the traffic light information.

The state transition time of the directional signal of interest is the time at which a current state of the directional signal of interest transitions to a stop state.

The positioning module detects the position and the heading direction of the autonomous vehicle based on a Global Navigation Satellite System (GNSS) signal, and based on the position and the heading direction of the autonomous vehicle, the navigation module selects the intersection of interest on a precision map.

Another exemplary embodiment of the present disclosure provides a method of processing traffic light information for an autonomous vehicle, the method including: detecting a position and a heading direction of an autonomous vehicle; selecting an intersection of interest based on the position and the heading direction of the autonomous vehicle; and selecting traffic light information of the intersection of interest from a V2I message, and selecting signal information for a directional signal of interest corresponding to a direction of travel of the autonomous vehicle at the intersection of interest from the traffic light information.

The intersection of interest is an intersection that the autonomous vehicle is to reach first.

The method further includes calculating a distance between the autonomous vehicle and a stop line of the intersection of interest.

When the distance between the autonomous vehicle and the stop line of the intersection of interest is less than or equal to a preset threshold, traffic light information of the intersection of interest is selected from the V2I message, and signal information for a directional signal of interest corresponding to a direction of travel of the autonomous vehicle at the intersection of interest is selected from the traffic light information.

The threshold is variable based on a vehicle speed of the autonomous vehicle.

The threshold is variable to be proportional to a vehicle speed of the vehicle.

The signal information for the directional signal of interest includes a direction, a state, and a state transition time of the directional signal of interest.

A state transition time of the directional signal of interest is determined based on a min end time from the traffic light information.

A state of the directional signal of interest is determined based on an event state for the directional signal of interest in the traffic light information.

The position and the heading direction of the autonomous vehicle are detected based on a Global Navigation Satellite System (GNSS) signal, and in the selecting of the intersection of interest based on the position and the heading direction of the autonomous vehicle, the intersection of interest is selected on a precision map.

According to the apparatus and the method of processing traffic light information of the autonomous vehicle according to the present disclosure, it is possible to selectively receive and process signal information of an intersection of interest based on the position and the heading direction of the autonomous vehicle, so that it is possible to accurately and quickly determine the signal information of interest at the intersection of interest.

A position and a heading direction of an autonomous vehicle and a location of an intersection of interest may be detected by using a precision map, so that the absolute position of the vehicle and the location of the intersection of interest related to the absolute location may be accurately detected.

By selecting the traffic light information of the intersection of interest based on a comparison between the distance from the autonomous vehicle to the stop line of the intersection of interest and a preset threshold, it is possible to provide the signal information of the intersection of interest with accurate timing.

Since the threshold is varied based on the vehicle speed v of the autonomous vehicle, traffic light information may be acquired at optimal timing.

BRIEF DESCRIPTION OF THE DRAWINGS

FIG. 3 is a diagram illustrating a data frame of traffic light information.

FIG. 4 is a diagram illustrating a final signal according to signal identification numbers 1 and 2.

DETAILED DESCRIPTION

Figure 1:
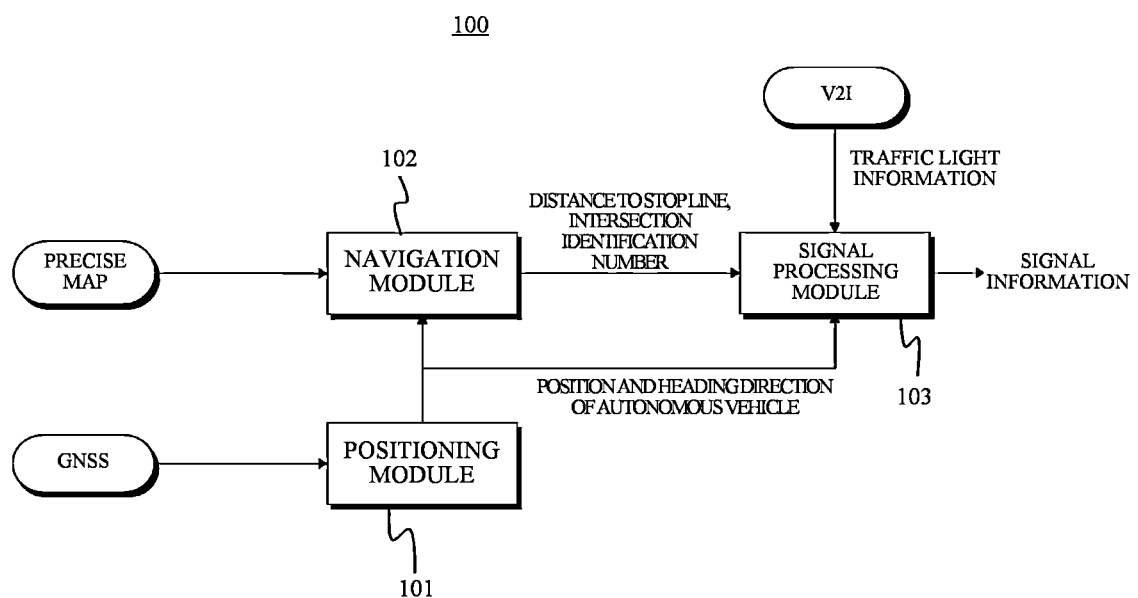
FIG. 1 is a block diagram of a traffic light information processing apparatus for an autonomous vehicle, according to an exemplary embodiment of the present disclosure.

The advantages and characteristics of the present disclosure, and a method for achieving the advantages and characteristics will become clear by referring to the exemplary embodiment, which is described below in detail, together with the accompanying drawings. However, the present disclosure is not limited to exemplary embodiments disclosed herein but will be implemented in various forms, and the exemplary embodiments are provided so that the present disclosure is completely disclosed, and a person of ordinary skilled in the art can fully understand the scope of the present disclosure, and the present disclosure will be defined only by the scope of the appended claims. Accordingly, in several exemplary embodiments, well-known process steps, well-known element structures, and well-known technologies are not described in detail in order to avoid obscuring the present disclosure. Throughout the specification, the same reference numeral indicates the same constituent element.

In the drawings, the thickness of layers and regions are exaggerated for clarity. Like reference numerals designate like elements throughout the specification.

In the present specification, terms, such as a first, a second, and a third, may be used for describing various constituent elements, but the constituent elements are not limited by the terms. The terms are used for discriminating one constituent element from other constituent elements. For example, without departing from the scope of the present disclosure, a first constituent element may be named as a second or third constituent element, and similarly, a second constituent element and a third constituent element may be alternately named.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined.

Hereinafter, with reference to FIGS. 1 to 5, a traffic light information processing apparatus and a traffic light information processing method for an autonomous vehicle according to an exemplary embodiment of the present disclosure will be described in detail as follows.

Figure 2:
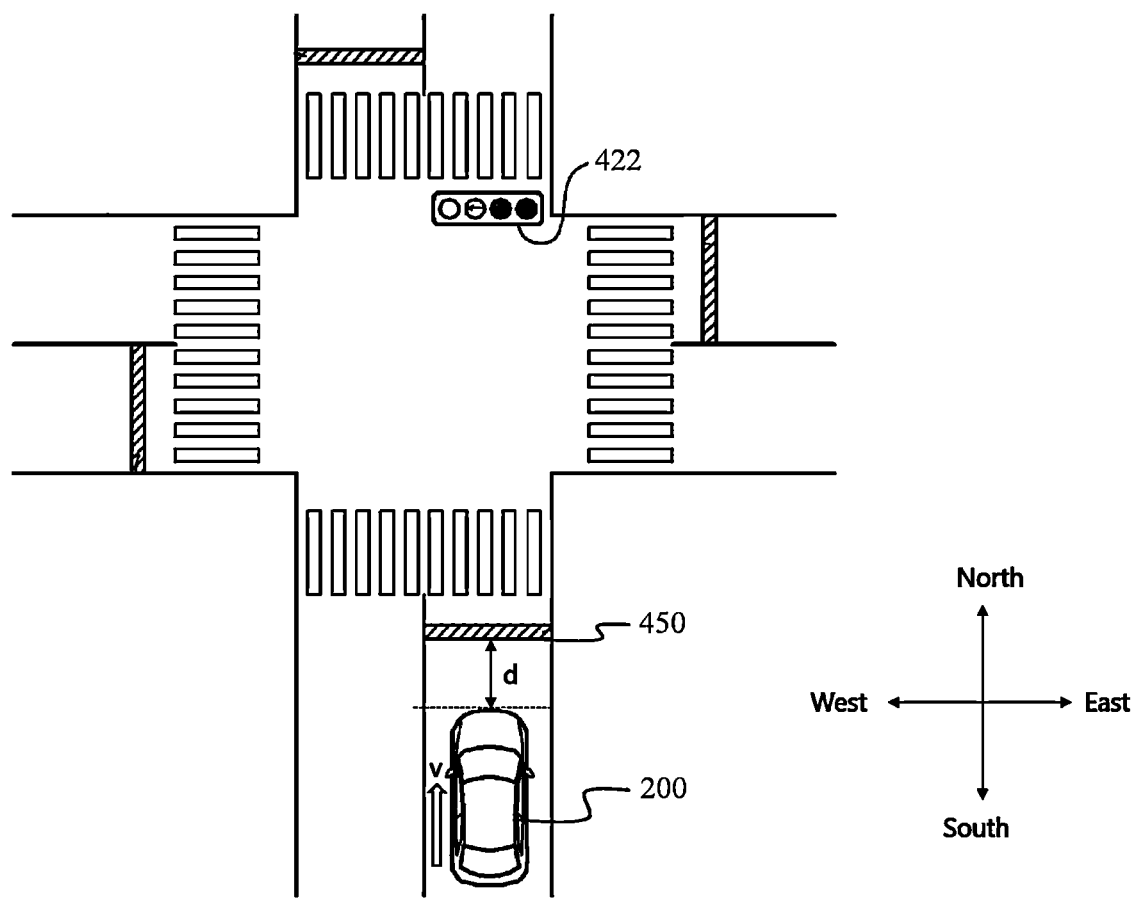
FIG. 2 is a diagram for describing a movement direction of an autonomous vehicle at an intersection of interest.

FIG. 1 is a block diagram of a traffic light information processing apparatus 100 for an autonomous vehicle, according to an exemplary embodiment of the present disclosure, and FIG. 2 is a diagram for describing a movement direction of an autonomous vehicle 200 at an intersection of interest.

The traffic light information processing apparatus 100 of the autonomous vehicle 200 of the present disclosure may include a positioning module 101, a navigation module 102, and a signal processing module 103, as illustrated in FIG. 1.

The positioning module 101 may detect a position (for example, absolute position) and a heading direction of the autonomous vehicle 200. For example, the positioning module 101 may detect a position and a heading direction of the autonomous vehicle 200 based on a Global Navigation Satellite System (GNSS) signal.

The navigation module 102 may select an intersection of interest based on the position and the heading direction of the autonomous vehicle 200. For example, the navigation module 102 may select an intersection of interest on the precision map based on the position and the heading direction of the autonomous vehicle 200. In other words, the navigation module 102 may select one intersection on the precise map as the intersection of interest that will be the first intersection reached by the autonomous vehicle 200. At this time, the navigation module 102 may select the intersection of interest by obtaining an identification number (hereinafter, the intersection identification number) of the intersection of interest.

The signal processing module 103 may select traffic light information of the intersection of interest from a Vehicle to Infrastructure (V2I) message, and may select and signal information for the directional signal of interest that corresponds to the travel direction (or heading direction) of the autonomous vehicle at the intersection of interest from the traffic light information and provide the selected signal information. For example, when the path of the autonomous vehicle 200 is set in the direction of going straight from south (S) to north (N) of the intersection of interest, the signal processing module 103 may select signal information for the go-straight signal from south (S) to north (N) of the intersection of interest from the traffic light information, and provide the selected signal information for the go-straight signal to a control unit of the autonomous vehicle 200. As another example, when the path of the autonomous vehicle 200 is set in a direction of going straight from south (S) to north (N) of the intersection of interest, or is alternatively set in a direction of turning left from south (S) to west (W) of the intersection of interest depending on traffic conditions, the signal processing module 103 may select signal information for a go-straight signal from south (S) to north (N) direction at the intersection of interest and signal information for a left turn signal from south (S) to west (W) direction at the intersection of interest from the traffic light information, and provide the selected signal information for the go-straight signal and the selected signal information for the left turn signal to the control unit of the autonomous vehicle 200.

The signal information for the directional signal of interest described above may include, for example, a state of the directional signal of interest and a state transition time of the directional signal of interest. As one example, when the directional signal of interest is a go-straight signal, a state of the directional signal of interest may refer to three states of the go-straight signal. For example, the go-straight signal may have a green state (or green signal state), which means go-straight is possible, an amber state (or amber signal state), which means go-straight is possible (or waiting) depending on the situation, or a red state (or red signal state), which means that go-straight is not possible.

A state transition time of a directional signal of interest may mean, for example, the remaining time for the directional signal of interest to change from a current state to a red state (or a stationary state). For example, when the directional signal of interest is a left turn signal, the state transition time of the directional signal of interest may mean the remaining time for the left turn signal to change from a green state (or amber state) to a red state. On the other hand, the transition time described above may be substantially zero when the current state of the directional signal of interest is already the red state.

In the meantime, a traffic light 422 in FIG. 2 may be a traffic light indicating a possible direction of travel for the autonomous vehicle 200 located to the south.

FIG. 3 is a diagram illustrating a data frame of traffic light information.

The data frame of traffic light information illustrated in FIG. 3 may include an intersection identification number (I-ID), an identification number for each directional signal (hereinafter, directional identification number; signal group ID), an event state for each directional signal, and a min End Time for each directional signal. Here, an event state of a directional signal may refer to a signal state (green state, amber state, red state) of the corresponding directional signal.

The signal processing module 103 may determine a state of the directional signal of interest based on an event state for the directional signal of interest in the traffic light information.

The signal processing module 103 may determine a state transition time for the directional signal of interest based on the min end time in the traffic light information. Herein, the min End Time may refer to the remaining time for the signal to change from the corresponding event state to another state.

Additionally or alternatively, the above-described navigation module 102 may further calculate the distance D between the autonomous vehicle 200 and a stop line 450 of the intersection of interest. When the distance d between the autonomous vehicle 200 and the stop line 450 of the intersection of interest calculated by the navigation module 102 is less than or equal to a preset threshold, the signal processing module 103 may select the traffic light information of the intersection of interest from the V2I message. In other words, when the distance between the autonomous vehicle 200 and the intersection of interest is at least somewhat close, the signal processing module 103 may provide the signal information described above.

Additionally or alternatively, the threshold may be variable based on the vehicle speed V of the autonomous vehicle 200. For example, the threshold may vary in a direction proportional to the vehicle speed V of the autonomous vehicle 200. In other words, a higher speed of the autonomous vehicle 200 causes the autonomous vehicle 200 to reach the stop line 450 of the intersection of interest earlier, but a lower speed of the autonomous vehicle 200 causes the autonomous vehicle 200 to reach the stop line 450 of the intersection of interest later, so that when the threshold is varied to match the vehicle speed V, the traffic light information may be acquired at optimal timing. In other words, by increasing the threshold when the vehicle speed V is high and decreasing the threshold when the vehicle speed V is low, the traffic light information may be determined at the optimal time.

For example, when the intersection of interest at intersection identification number 400 is a four-way intersection, the signals for each direction may include signals for two directions, such as a go-straight signal and a left turn signal. In this case, there may be a total of eight signal types for the four-way intersection. In one example, a directional signal corresponding to south may include a go-straight signal from south and a left turn signal from south, a directional signal corresponding to east may include a go-straight signal from east and a left turn signal from east, a directional signal corresponding to north may include a go-straight signal from north and a left turn signal from north, and a directional signal corresponding to west may include a go-straight signal from west and a left turn signal from west.

In one example, the signal identification numbers for the four traffic lights disposed at the four-way intersection may include identification numbers 1 and 2 corresponding to the signals of the traffic light for indicating the direction relative to the south (hereinafter, the south traffic light), identification numbers 3 and 4 corresponding to the signals of the traffic light for indicating the direction relative to the east (hereinafter, the east traffic light), identification numbers 5 and 6 corresponding to the signals of the traffic light for indicating the direction relative to the north (hereinafter, the north traffic light), and identification numbers 7 and 8 corresponding to the signals of the traffic light for indicating the direction relative to the west (hereinafter, the west traffic light). For example, signal identification number 1 relates to the go-straight signal at the south traffic light (for example, the signal light to which vehicles traveling from the south on the four-way intersection refer), signal identification number 2 relates to the left turn signal at the south traffic light, signal identification number 3 relates to the go-straight signal at the east traffic light (for example, the signal light to which vehicles traveling from the east on the four-way intersection refer), signal identification number 4 relates to the left turn signal at the east traffic light, signal identification number 5 relates to the go-straight signal at the north traffic light (for example, the signal light to which vehicles traveling from the north on the four-way intersection refer), signal identification number 6 relates to the left turn signal at the north traffic light, signal identification number 7 relates to the go-straight signal at the west traffic light (for example, the signal light to which vehicles traveling from the west on the four-way intersection refer), and signal identification number 8 relates to the left turn signal at the west traffic light.

On the other hand, when the intersection is an eight-way intersection instead of a four-way intersection, there may be a total of 16 signal types for the eight-way intersection.

FIG. 4 is a diagram illustrating a final signal according to the signal identification numbers.

As described above, when the path of the autonomous vehicle 200 is set in the direction of going straight from south (S) to north (N) of the intersection of interest, or alternatively, is set, depending on traffic conditions, in the direction of turning left from south (S) to west (W) of the intersection of interest, the signal processing module 103 may be provided with the signal identification numbers 1 and 2 as signal information.

The south traffic light described above may have a green state (or green signal state) for the go-straight signal and the left turn signal. Alternatively, the south traffic light may have a green state on a go-straight signal and a red state on a left turn signal, or the south traffic light may have a red state on a go-straight signal and a green state on a left turn signal. Alternatively, the south traffic light may have the red state or amber state for both the go-straight signal and the left turn signal.

When signal identification numbers 1 and 2 are selected, the final signal for these signal identification numbers 1 and 2 is illustrated in FIG. 4. For example, the signals in FIG. 4 represent the current signal status of the go-straight signal and the left turn signal for the south traffic light 422 described above.

Figure 5:
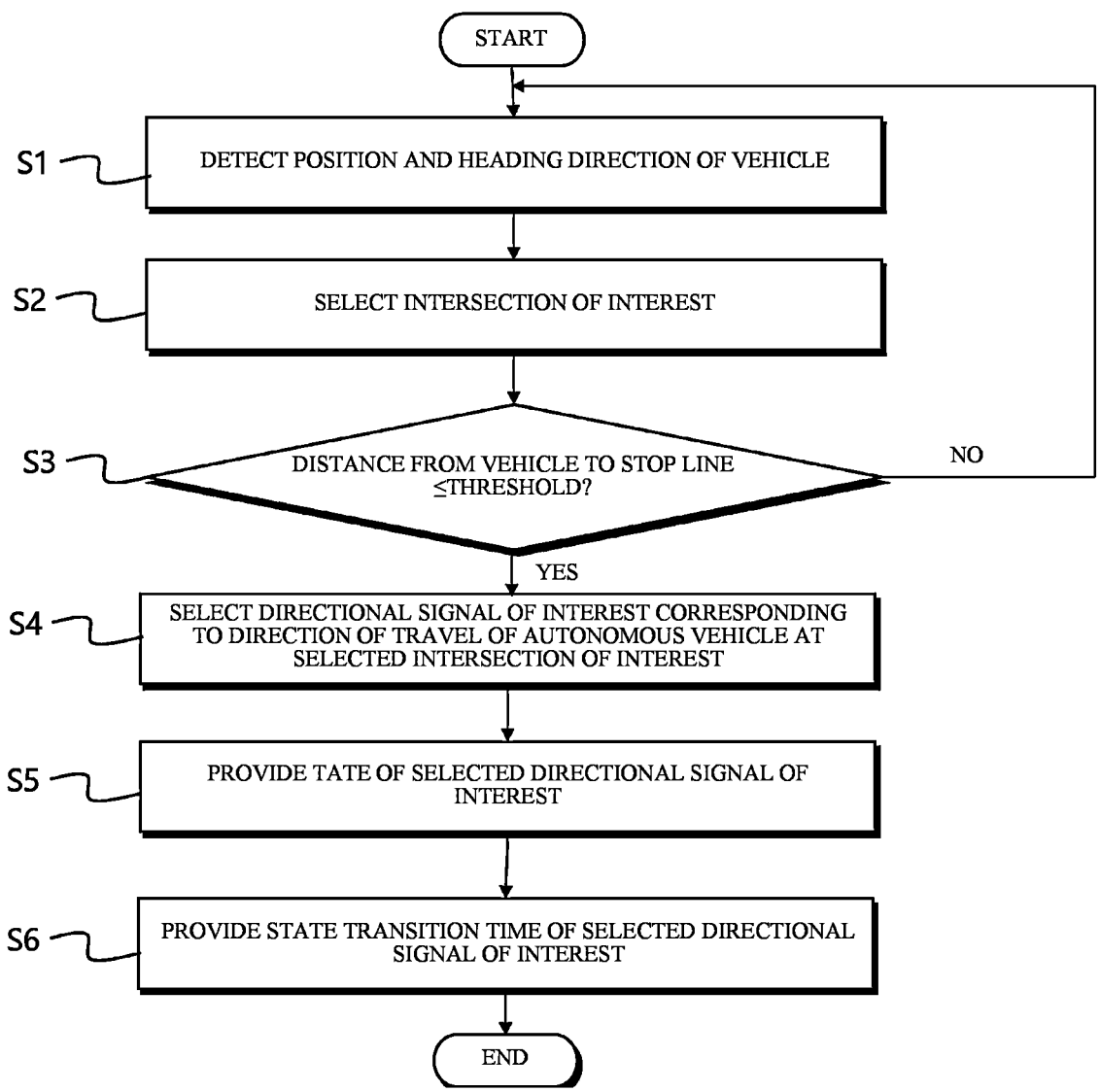
FIG. 5 is a flowchart for describing a traffic light information processing method for an autonomous vehicle according to an exemplary embodiment of the present disclosure.

FIG. 5 is a flowchart for describing a traffic light information processing method for an autonomous vehicle according to an exemplary embodiment of the present disclosure.

First, a position and a heading direction of the autonomous vehicle 200 are detected (S1). In this case, the position and the heading direction of the autonomous vehicle 200 may be detected on a precision map.

Next, an intersection of interest is selected based on the position and the heading direction of the autonomous vehicle 200 (S2). In this case, the intersection of interest may be selected on the precision map. Meanwhile, the intersection identification number of the intersection of interest on the precision map may match the intersection identification number of the traffic light information.

Subsequently, the distance from the autonomous vehicle 200 to the stop line 450 is compared to a preset threshold (S3). When the distance as a result of the comparison is less than or equal to the threshold (for example, when the autonomous vehicle 200 is sufficiently close to the intersection of interest), a directional signal of interest corresponding to the direction of travel of the autonomous vehicle 200 at the selected intersection of interest is selected (S4).

Additionally or alternatively, the threshold may be variable based on the vehicle speed V of the autonomous vehicle 200. For example, the threshold may vary in a direction proportional to the vehicle speed V of the autonomous vehicle 200. In other words, a higher speed of the autonomous vehicle 200 causes the autonomous vehicle 200 to reach the stop line 450 of the intersection of interest earlier, but a lower speed of the autonomous vehicle 200 causes the autonomous vehicle 200 to reach the stop line 450 of the intersection of interest later, so that when the threshold is varied to match the vehicle speed V, the traffic light information may be acquired at optimal timing.

Next, the state of the selected directional signal of interest is provided to the autonomous vehicle 200 (S5).

Subsequently, the state transition time of the selected directional signal of interest may be provided to the autonomous vehicle 200 (S6).

In the meantime, combinations of each block in the block diagram and each step in the flowchart attached to the present disclosure may be performed by computer program instructions. These computer program instructions may be embodied in a processor of a general purpose computer, special purpose computer, or other programmable data processing equipment, so that the instructions executed by the processor of the computer or other programmable data processing equipment generate means for performing the functions described in each block of the block diagram or in each step of the flowchart. These computer program instructions may also be stored in a computer-usable or computer-readable memory that may direct a computer or other programmable data processing equipment to implement a function in a particular manner, so that it is also possible that the instructions stored in the computer-usable or computer-readable memory produce articles containing instruction means for performing the function described in each block of the block diagram. The computer program instructions may also be mounted on a computer or other programmable data processing equipment, so that the instructions for performing a computer or other programmable data processing equipment by performing a series of operational steps on a computer or other programmable data processing equipment to create a computer-executed process may provide operations for executing functions described in the blocks of the flowchart.

Each block or each step may represent a portion of modules, segments, or codes including one or more executable instructions for executing specified logical function(s). It should also be noted that in some alternative exemplary embodiments, it is also possible for the functions mentioned in blocks to occur out of order. For example, it is possible that two blocks illustrated one after another may in fact be performed substantially simultaneously, or that the blocks may sometimes be performed in the reverse order according to the corresponding function.

In this case, the term "~unit" used in the present exemplary embodiment refers to software or a hardware component, such as a Field Programmable Gate Array (FPGA) or an Application Specific Integrated Circuit (ASIC), and the "~unit" serves a specific role. However, the "~unit" is not limited to software or hardware. The "~unit" may also be configured to be included in an addressable storage medium, and may be configured to reproduce one or more processors. Accordingly, as an example, the "~unit" includes components, such as software components, object-oriented software components, class components, and task components, and processes, functions, attributes, procedures, subroutines, segments of a program code, drivers, firmware, micro-codes, circuits, data, database, data structures, tables, arrays, and variables. The components and the function provided in the "~unit" may be combined into a smaller number of components and "~unit" or further separated into additional components and "~units". In addition, components and the "~unit" may also be implemented to play one or more CPUs within a device or a security multimedia card.

It will be understood by those skilled in the art that various changes in a specific form and details may be made therein without the change of the technical spirit or the essential features of the present disclosure. Therefore, the aforementioned exemplary embodiments are all exemplary and are not restricted to a limited form. The scope of the present specification is indicated by the scope of the claims set forth herein, rather than by the detailed description above, and should be construed to include the meaning and scope of the claims and all modifications or variations derived from the concept of equivalents thereof.

On the other hand, the specification and the drawings disclose the exemplary embodiments of the present disclosure, and although certain terms are used, they are used in a general sense to facilitate the description and understanding of the disclosure, and are not intended to limit the scope of the specification. In addition to the embodiments disclosed herein, it will be apparent to one of ordinary skill in the art to which this disclosure belongs that other modifications based on the technical spirit of the present specification are possible.

What is claimed is:

1. An apparatus for processing traffic light information for an autonomous vehicle, the apparatus comprising: a Global Navigation Satellite System (GNSS) signal receiver to detect a position and a heading direction of an autonomous vehicle based on a GNSS signal; a navigator for selecting an intersection of interest on a precision map based on the position and the heading direction of the autonomous vehicle; and a signal processor for selecting traffic light information of the intersection of interest, which includes a plurality of directional signals for each movement direction at the intersection of interest, from a V2I message, and selecting signal information for a directional signal of interest of the plurality of directional signals, the directional signal of interest corresponding to a direction of travel of the autonomous vehicle and additionally selecting signal information for an additional directional signal of the plurality of directional signals, the additional directional signal corresponding to an alternate direction alternatively set depending on traffic conditions, at the intersection of interest from the traffic light information.

2. The apparatus of claim 1, wherein the intersection of interest is an intersection that the autonomous vehicle is to reach first.

3. The apparatus of claim 1, wherein the navigator further calculates a distance between the autonomous vehicle and a stop line of the intersection of interest.

4. The apparatus of claim 3, wherein when the distance between the autonomous vehicle and the stop line of the intersection of interest calculated by the navigator is less than or equal to a preset threshold, the signal processor selects traffic light information of the intersection of interest from the V2I message.

5. The apparatus of claim 4, wherein the threshold is variable based on a vehicle speed of the autonomous vehicle.

6. The apparatus of claim 1, wherein the signal information for the directional signal of interest includes a state of the directional signal of interest and a state transition time of the directional signal of interest.

7. The apparatus of claim 6, wherein the signal processor determines a state of the directional signal of interest based on an event state for the directional signal of interest in the traffic light information.

8. The apparatus of claim 7, wherein the signal processor determines a state transition time of the directional signal of interest based on a min end time from the traffic light information.

9. The apparatus of claim 8, wherein the state transition time of the directional signal of interest is the time at which a current state of the directional signal of interest transitions to a stop state.

10. A method of processing traffic light information for an autonomous vehicle, the method comprising: detecting, by a Global Navigation Satellite System (GNSS) signal receiver, a position and a heading direction of an autonomous vehicle based on a GNSS signal; selecting, by a navigator, an intersection of interest based on the position and the heading direction of the autonomous vehicle; and selecting, by a signal processor, traffic light information of the intersection of interest, which includes a plurality of directional signals for each movement direction at the intersection of interest, from a V2I message, and selecting signal information for a directional signal of interest of the plurality of directional signals, the directional signal of interest corresponding to a direction of travel of the autonomous vehicle and additionally selecting signal information for an additional directional signal of the plurality of directional signals, the additional directional signal corresponding to an alternate direction alternatively set depending on traffic conditions, at the intersection of interest from the traffic light information.

11. The method of claim 10, wherein the intersection of interest is an intersection that the autonomous vehicle is to reach first.

12. The method of claim 10, further comprising: calculating a distance between the autonomous vehicle and a stop line of the intersection of interest.

13. The method of claim 12, wherein when the distance between the autonomous vehicle and the stop line of the intersection of interest is less than or equal to a preset threshold, traffic light information of the intersection of interest is selected from the V2I message, and the signal information for the directional signal of interest corresponding to the direction of travel of the autonomous vehicle at the intersection of interest is selected from the traffic light information.

14. The method of claim 13, wherein the threshold is variable based on a vehicle speed of the autonomous vehicle.

15. The method of claim 14, wherein the threshold is variable to be proportional to a vehicle speed of the vehicle.

16. The method of claim 10, wherein the signal information for the directional signal of interest includes a direction, a state, and a state transition time of the directional signal of interest.

17. The method of claim 16, wherein a state transition time of the directional signal of interest is determined based on a min end time from the traffic light information.

18. The method of claim 16, wherein a state of the directional signal of interest is determined based on an event state for the directional signal of interest in the traffic light information.

* * * * *